United States Patent [19]

Harrill

[11] 4,244,536
[45] Jan. 13, 1981

[54] EXTENSION CORD REEL

[76] Inventor: Thomas D. Harrill, Box 330, Mabank, Tex. 75147

[21] Appl. No.: 89,889

[22] Filed: Oct. 31, 1979

[51] Int. Cl.³ .............................................. B65H 75/40
[52] U.S. Cl. ................................. 242/96; 191/12.2 R
[58] Field of Search .............. 242/96, 85, 84.8, 107, 242/107.13, 115, 116; 191/12.2 R, 12.4

[56] References Cited

U.S. PATENT DOCUMENTS

| 3,423,044 | 1/1969 | Beiderwell | 242/96 |
| 3,837,448 | 9/1974 | Hogstrom | 191/12.2 R X |
| 3,870,133 | 3/1975 | Brennenstuhi | 191/12.2 R |
| 4,061,290 | 12/1977 | Harrill | 242/96 |

FOREIGN PATENT DOCUMENTS 2384700  11/1978  France .......................... 242/96

*Primary Examiner*—Edward J. McCarthy
*Attorney, Agent, or Firm*—Clarence A. O'Brien; Harvey B. Jacobson

[57] ABSTRACT

A hollow axially short and generally cylindrical body is provided and is open at one end. The other end of the body includes a closure end wall having a central portion which is displaced longitudinally of the body approximately one-half the length thereof toward the open end of the body and a pair of front and rear generally cylindrical aligned spool core sections are disposed within the body in front to rear aligned relation. The front and rear spool core sections include rear and front radially inwardly projecting annular end walls and front and rear radially outwardly projecting circumferential flanges. A generally cylindrical hub including a radially outwardly projecting forward end flange is also provided and the annular end walls of the spool sections are journalled on the hub, the forwardly displaced portion of the rear wall of the body being centrally apertured and a threaded fastener being secured through the hub and the rear wall central portion.

8 Claims, 3 Drawing Figures

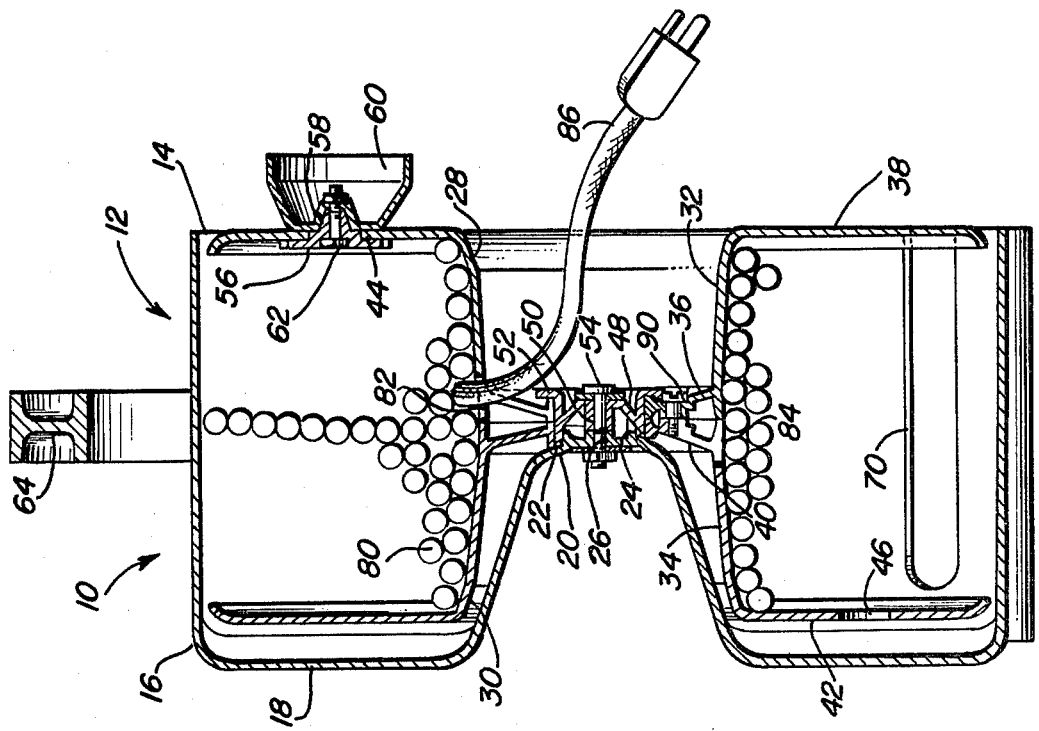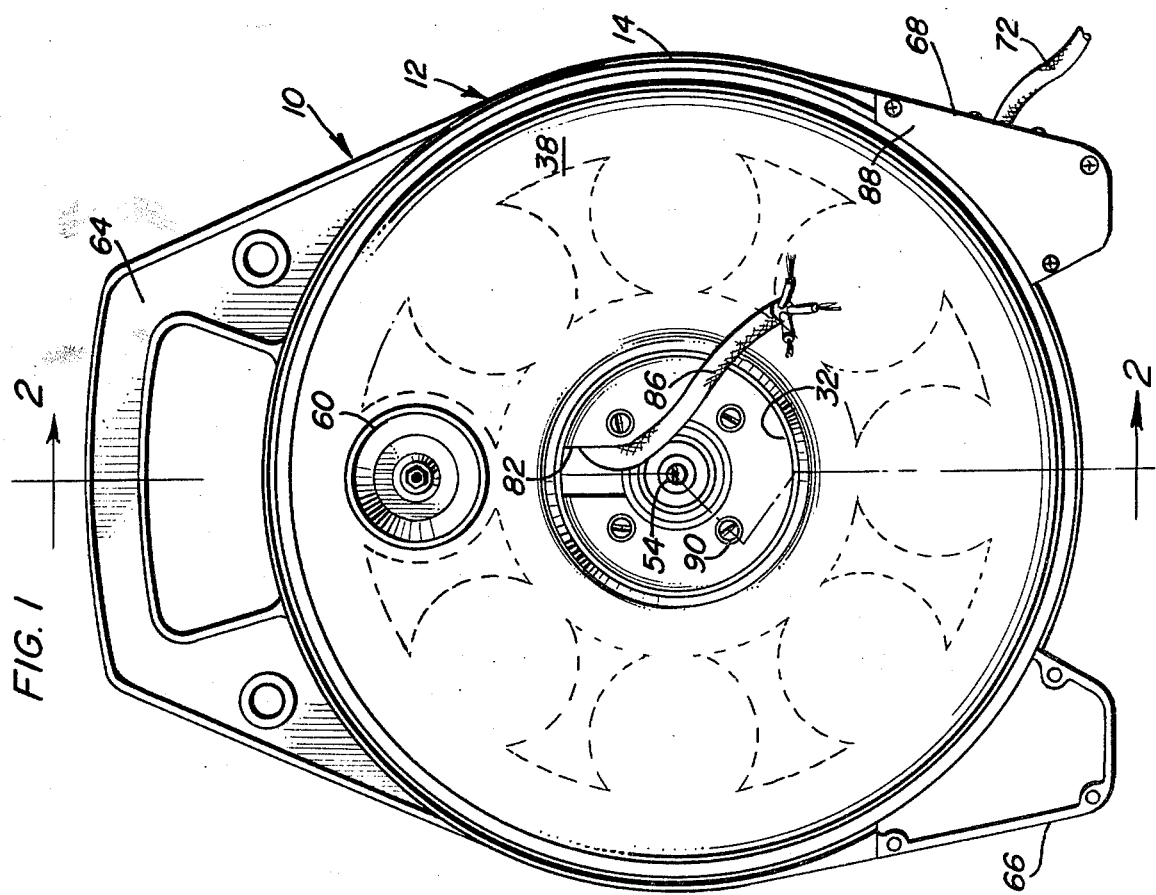

EXTENSION CORD REEL

BACKGROUND OF THE INVENTION

The reel construction of the instant invention comprises an improvement over the extension cord reel and case disposed in my prior U.S. Pat. No. 4,061,290, dated Dec. 6, 1977. The reel of the instant invention includes an improved spool construction and spool mounting structure as well as a simplified spool handle for rotating the spool relative to the housing portion.

BRIEF DESCRIPTION OF THE INVENTION

The extension cord reed of the instant invention includes a pair of identical opposite end spool sections secured together in end-to-end reverse relation through the utilization of a removable hub from which the spool sections are journalled and the hub is removably supported from a forwardly displaced central rear end wall portion of a cylindrical body whose forward end is open. By this construction, the extension cord reel may be inexpensively produced and readily assembled.

The main object of this invention is to provide an improved extention cord reel constructed in a manner whereby certain major components thereof may be duplicated and the various components of the extension cord reel may be readily assembled.

Another object of this invention is to provide an extension cord reel in which an extension cord may be conveniently housed and from which an extension cord may be readily unreeled.

Still another important object of this invention is to provide an extension cord reel including only four major components, two of which are duplicates of each other, and which may be utilized to house a considerable length of extension cord.

A final object of this invention to be specifically enumerated herein is to provide an extension cord reel construction in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a front elevational view of the extension reel of the instant invention;

FIG. 2 is a vertical sectional view taken substantially upon the plane indicated by the sectional line 2—2 of FIG. 1.

DETAILED DESCRIPTION OF THE INVENTION

Figure 3:
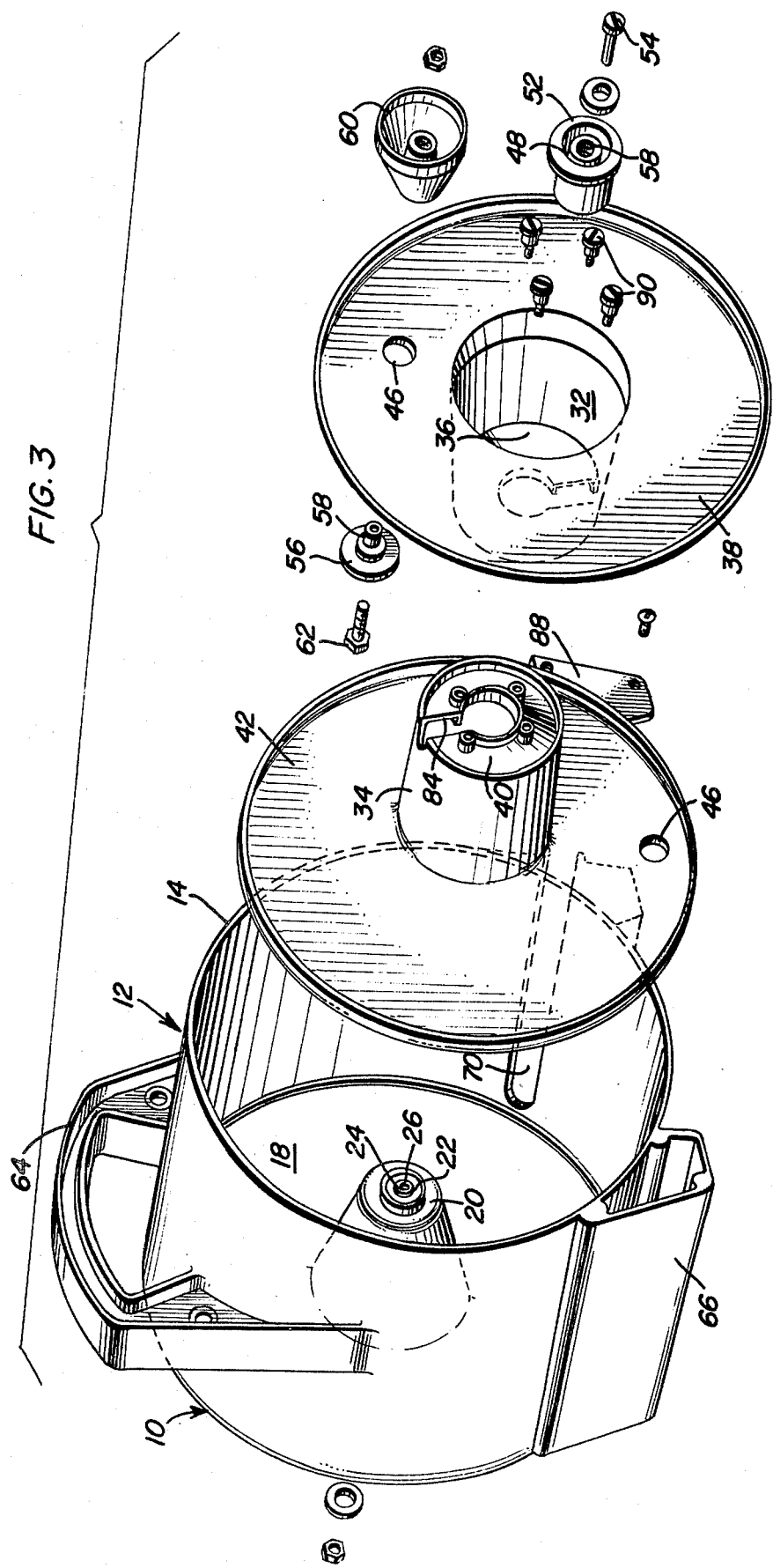
FIG. 3 is an exploded perspective view of the extension cord reel construction.

Referring now more specifically to the drawings, the numeral 10 generally designates the extension cord reel of the instant invention. The extension cord reel 10 includes a generally cylindrical axially short hollow body or housing referred to in general by the reference numeral 12. The housing 12 includes an open front end 14 and a rear end 16 closed by a rear wall 18 having a forwardly displaced central portion 20 disposed approximately midway being the front and rear ends of the housing 12.

The central portion 20 defines a forwardly facing annular seat 22 centrally thereon and the seat 22 has its inner periphery being defined by the outer surfaces of a forwardly projecting cylindrical flange 24 coaxial with the seat 22. The central portion 20 is centrally apertured as at 26.

The reel 10 includes a pair of identical front and rear spool sections 28 and 30 disposed in end-to-end reversed relation. The spool sections 28 and 30 include generally cylindrical body portions 32 and 34, respectively, and the cylindrical body portion 32 includes a rear radially inwardly projecting annular end wall 36 and a forward radially outwardly projecting circumferential retaining flange 38. The cylindrical body portion 34 includes a forward radially inwardly projecting annular end wall 40 and a rear radially outwardly projecting circumferential retaining flange 42. The flanges 38 and 42 are identically apertured as at 44 and 46 and a cylindrical hub 48 is provided and defines a central bore 50 extending therethrough. The hub 48 includes a forward radially outwardly projecting circumferential retaining flange 52 and the annular end walls 36 and 40 are removably journalled on the hub 48 rearward of the retaining flange 52, the bore 50 being registered with the bore or aperture 26 and a threaded fastener 54 being secured through the bore 50 and aperture 26 whereby the hub 48 is secured to the central portion 22 of the rear wall 18 with the rear end of the cylindrical hub 48 seated in the seat 22.

A backing washer assembly 56 is provided and includes a forwardly projecting centrally apertured mounting portion 58. The backing washer assembly 56 is abutted against the rear side of the retaining flange 38 of the spool section 28 with the mounting portion 58 projecting through the bore 54. A handle 60 is mounted on the mounting portion 58 and retained in position thereon by means of a removable fastener 62. The upper portion of housing 12 includes an integral handle 64 and the lower portion of the housing 12 includes depending integral leg portions 66 and 68, a further lower portion of the housing 68 being longitudinally slotted as at 70 to receive one end 72 of an extension cord 80 therethrough. Also, the spool sections 28 and 30 are apertured as at 82 and 84 whereby the other end 86 of te extension cord 80 may extend through the aperture 82. The slot 70 opens into a hollow portion of the leg 68 removably closed by a removable cover plate 88. Further, the spool core sections 28 and 30 are secured together by suitable threaded fasteners 90.

Inasmuch as the spool core sections 28 and 30 are identically formed, the reel 10 includes only three differently constructed major components. The housing 12 comprises one of the major components, the hub 48 comprises a second of the major components and each of the spool sections 28 and 30 comprises a third major component. It is deemed readily apparent that the reel may thus be economically produced and it it will further be realized from the foregoing description that the reel may have its components readily assembled. Of course, it is proposed that the various major components of the reel will be molded of a suitable plastic material.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An extension cord reel construction including a hollow body having opposite front and rear ends, a rear closure wall closing the rear end of said body and including a central portion projecting forwardly toward the forward end of said body and terminating forwardly generally centrally intermediate the front and rear ends of the body, a pair of front and rear generally cylindrical and front-to-rear aligned spool core sections, said rear spool core section including a rear radially outwardly projecting circumferential flange and a front inwardly projecting annular wall, said front spool section including a front radially outwardly projecting circumferential flange and a rear inwardly projecting annular wall, said spool sections being end abutted and secured together with the front and rear facing surfaces of said front and rear annular walls being disposed in abutting relation, a generally cylindrical front-to-rear extending hub including a generally cylindrical outer rim portion and an annular central hub portion, said outer rim portion including a front radially outwardly projecting flange, said front and rear annular walls being journalled on said outer rim portion rearwardly of said front radially outwardly projecting flange of said hub, said central portion of said rear closure wall having a central bore formed therethrough and defining a forwardly facing annular seat surface concentric with and about said central bore, the rear end of said outer rim being seated against said seat surface, and a fastener secured through said central bore and said annular central hub portion, said front and rear spool sections being at least substantially enclosed within said hollow body with the rear spool core section loosely telescoped over said central portion of said rear wall and said front circumferential flange subsequently completely closing the front end of said body.

2. The combination of claim 1 wherein said fastener comprises an elongated longitudinally tensionable fastener including opposite end thrust member defining portions thereon opposing the front end of said annular central hub portion and the rear side of said central portion of said rear wall.

3. The combination of claim 1 wherein said front and rear spool sections are identically formed.

4. The combination of claim 1 wherein said front radially outwardly projecting circumferential flange of said front spool section includes an opening formed therethrough, a backing washer assembly abutted against the rear side of the last mentioned flange and including a mounting portion projecting forwardly through said opening, and a handle mounted on said forwardly projecting mounting portion and secured thereon by a fastener removably secured through said handle and said forwardly projecting mounting portion.

5. The combination of claim 1 wherein one of said inwardly projecting annular walls and an adjacent portion of the corresponding cylindrical spool core section include openings formed therethrough to receive one end of an extension cord through the last mentioned openings.

6. The combination of claim 5 wherein said body includes a side wall portion having a slot formed therein for receiving one end thereof an extension cord therethrough.

7. The combination of claim 6 wherein said front radially outwardly projecting circumferential flange of said front spool section includes an opening formed therethrough, a backing washer assembly abutted against the rear side of the last mentioned flange and including a mounting portion projecting forwardly through said opening, and a handle mounted on said forwardly projecting mounting portion and secured thereon by a fastener removably secured through said handle and said forwardly projecting mounting portion.

8. The combination of claim 7 wherein said front and rear spool sections are identically formed.

* * * * *